(12) United States Patent
Kang (10) Patent No.: US 12,515,628 B2
(45) Date of Patent: Jan. 6, 2026

(54) BRAKE REDUNDANCY SYSTEM AND OPERATION METHOD

(71) Applicant: HL MANDO CORPORATION, Gyeonggi-do (KR)

(72) Inventor: Daedong Kang, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 121 days.

(21) Appl. No.: 18/385,395

(22) Filed: Oct. 31, 2023

(65) Prior Publication Data

US 2024/0308486 A1    Sep. 19, 2024

(30) Foreign Application Priority Data

Mar. 14, 2023  (KR) .................... 10-2023-0033064

(51) Int. Cl.
  *B60T 8/92*    (2006.01)
  *B60T 17/22*   (2006.01)
(52) U.S. Cl.
  CPC ............... *B60T 8/92* (2013.01); *B60T 17/22* (2013.01); *B60T 2270/402* (2013.01); *B60T 2270/413* (2013.01)
(58) Field of Classification Search
  CPC ...... B60T 8/92; B60T 17/22; B60T 2270/402; B60T 2270/413; B60T 13/662; B60T 17/18; B60T 17/221; B60T 8/17; B60T 2270/403; B60W 50/0205; B60W 50/0225; B60W 60/001; B60W 2050/021; B60Y 2306/13; B60Y 2400/81
  See application file for complete search history.

(56) References Cited

FOREIGN PATENT DOCUMENTS

| JP | 5369170 | 12/2013 |
| KR | 10-2446142 | 9/2022 |
| KR | 20210002065 A * | 9/2022 |

OTHER PUBLICATIONS

Office Action dated Aug. 30, 2024 for Korean Patent Application No. 10-2023-0033064 and its English translation from Global Dossier.

* cited by examiner

*Primary Examiner* — Lindsay M Low
*Assistant Examiner* — Charles J Brauch
(74) *Attorney, Agent, or Firm* — WOMBLE BOND DICKINSON (US) LLP (57) ABSTRACT

In a brake redundancy system and a method of operating a brake redundancy system, a sub-controller can monitor the state of the main controller and perform the brake control on behalf of the main controller in the event of a failure of the main controller, thereby providing a more robust redundancy system than conventional brake redundancy systems from the viewpoint of the main controller.

18 Claims, 11 Drawing Sheets

BRAKE REDUNDANCY SYSTEM AND OPERATION METHOD

TECHNICAL FIELD

The present disclosure generally relates to a brake redundancy system and a method of operating a brake redundancy system, and more particularly, to a redundant brake system having multiple controllers and a method of operating a redundant brake system.

BACKGROUND

Generally, a brake system may include a service brake assembly and a parking brake assembly. The service brake assembly may have a rotor, a brake caliper, and brake pads on opposing sides of the rotor. The brake caliper is slidably supported on pins secured to an anchor bracket fixed to a non-rotatable component of a vehicle, and includes one or more piston bores, each of which houses a piston that is movable along a piston axis during a brake apply and release of the brake apply. The brake pads are connected to one or more pistons for movement between a non-braking position and a braking position where the brake pads are moved into frictional engagement with the opposed braking surfaces of the rotor. For example, when an operation of the vehicle depresses a brake pedal, the piston may be moved into contact with one brake pad and then move one brake pad into contact with one side of the rotor, while another opposing brake pad is moved into contact with an opposing side of the rotor. When a vehicle is stopped or parked, the parking brake assembly may be used to prevent movement of the vehicle. The parking brake assembly may be a discrete assembly, or may utilize one or more components of the service brake assembly. That is, the parking brake assembly may use the piston and the brake pads of the service brake assembly to create the brake apply. For example, the parking brake assembly may move the piston, which may move the brake pads into contact with the rotor to create and maintain a brake apply by clamping force applied to the rotor.

SUMMARY

An object of some embodiments of the present disclosure is to provide a brake redundancy system and a method of operating a brake redundancy system, in which a sub-controller monitors the state of a main controller and performs the brake control on behalf of the main controller in the event of a failure of the main controller.

Other objects not specified in the present disclosure may be further considered within the scope that can easily be inferred from the following detailed description and effects thereof.

A brake redundancy system according to a preferred embodiment of the present disclosure for achieving the above-mentioned object may comprise: a main controller that controls braking of a vehicle; and a sub-controller that monitors the state of the main controller and controls the braking of the vehicle on behalf of the main controller if it is determined that the operation of the main controller is impossible.

The sub-controller may monitor the state of the main controller based on main controller state information transmitted at a predetermined signal transmission cycle from the main controller connected through a communication line.

The main controller state information may comprise braking force state information of the main controller, indicating either normal or failure state, and operation function information of the main controller.

The sub-controller may update communication line state information indicating either normal or failure state and the main controller state information to history information.

The sub-controller may obtain a current state of the main controller based on the braking force state information and the communication line state information.

The sub-controller may control the braking of the vehicle on behalf of the main controller if the current state of the main controller is inoperable.

The sub-controller may obtain the current state of the main controller as operable if the braking force state information indicates a normal state and the communication line state information indicates a normal state and obtain the current state of the main controller as inoperable if the braking force state information indicates a failure state or the communication line state information indicates a failure state.

The sub-controller may control the braking of the vehicle based on the history information on behalf of the main controller if the current state of the main controller is inoperable.

The sub-controller may obtain the operation function information corresponding to the most recent time point when the braking force state information indicates a normal state from the history information, if the braking force state information indicates a failure state and the communication line state information indicates a normal state, and control the braking of the vehicle based on the obtained operation function information.

The sub-controller may obtain the operation function information corresponding to the most recent time point when the communication line state information indicates a normal state from the history information, if the communication line state information indicates a failure state, and control the braking of the vehicle based on the obtained operation function information.

The sub-controller may control the braking of the vehicle by driving an auxiliary brake module based on a target braking torque according to the obtained operation function information, if an operation function according to the obtained operation function information is a stop control function.

A method of operating a brake redundancy system comprising a main controller that controls braking of a vehicle and a sub-controller according to a preferred embodiment of the present disclosure for achieving the above-mentioned object may comprise: monitoring, at the sub-controller, the state of the main controller; and controlling, at the sub-controller, the braking of the vehicle on behalf of the main controller if it is determined that the operation of the main controller is impossible.

The monitoring may comprise monitoring the state of the main controller based on main controller state information transmitted at a predetermined signal transmission cycle from the main controller connected through a communication line.

The main controller state information may comprise braking force state information of the main controller, indicating either normal or failure state, and operation function information of the main controller.

The monitoring may comprise updating communication line state information indicating either normal or failure state and the main controller state information to history information.

The controlling may comprise obtaining a current state of the main controller based on the braking force state information and the communication line state information.

The controlling may comprise controlling the braking of the vehicle based on the history information on behalf of the main controller if the current state of the main controller is inoperable.

The controlling may comprise obtaining the operation function information corresponding to the most recent time point when the braking force state information indicates a normal state from the history information, if the braking force state information indicates a failure state and the communication line state information indicates a normal state, and controlling the braking of the vehicle based on the obtained operation function information.

The controlling may comprise obtaining the operation function information corresponding to the most recent time point when the communication line state information indicates a normal state from the history information, if the communication line state information indicates a failure state, and controlling the braking of the vehicle based on the obtained operation function information.

The controlling may comprise controlling the braking of the vehicle by driving an auxiliary brake module based on a target braking torque according to the obtained operation function information, if an operation function according to the obtained operation function information is a stop control function.

In a brake redundancy system and a method of operating a brake redundancy system according to preferred embodiments of the present disclosure, the sub-controller can monitor the state of the main controller and perform the brake control on behalf of the main controller in the event of a failure of the main controller, thereby providing a more robust redundancy system than conventional brake redundancy systems from the viewpoint of the main controller.

The effects of the present disclosure are not limited to those mentioned above, and other effects not mentioned will be clearly understood by those skilled in the art from the description below.

DETAILED DESCRIPTION

Hereinafter, embodiments of the present disclosure will be described in detail with reference to the accompanying drawings. Advantages and features of the present disclosure, and methods for achieving them, will become apparent with reference to the following embodiments in conjunction with the accompanying drawings. However, the present disclosure is not limited to the embodiments disclosed below and may be implemented in various different forms. The embodiments are provided only to complete the present disclosure and to allow those skilled in the art to which the present disclosure pertains to fully understand the scope of the present disclosure, and the present disclosure is defined only by the appended claims. The same reference numerals numbers designate the same components throughout the specification.

Unless otherwise defined, all terms (including technical and scientific terms) used herein may have the same meaning as those commonly understood by those of ordinary skill in the art to which the present disclosure pertains. In addition, terms defined in commonly used dictionaries are not interpreted ideally or excessively unless explicitly specifically defined.

In this specification, the terms such as "first", "second", or the like are used to distinguish one component from another, and the scope of rights should not be limited by these terms. For example, a first component may be referred to as a second component, and similarly, the second component may be referred to as the first component.

As used herein, the reference characters (for example, a, b, c, etc.) in each step are used for convenience of description, and are not intended to describe the sequence of the steps. The steps may occur in different sequences, as long as a specific sequence is not specifically described in the context. That is, the steps may occur in the same order as specified, may be performed simultaneously, or may be performed in the reverse order.

The terms such as "have", "may have", "include" and "may include" as used herein indicate the existence of corresponding features (for example, elements such as numerical values, functions, operations, or parts) and do not preclude the presence of additional features.

Moreover, the term "unit" as used herein refers to a software or hardware component such as a field programmable gate array (FPGA) or an application-specific integrated circuit (ASIC), and the "unit" performs certain roles. However, the "unit" is not limited to software or hardware. The "unit" may be configured to be stored in an addressable storage medium, or to execute one or more processors. For example, the "unit" may include components, such as software components, object-oriented software components, class components and task components, processes, functions, attributes, procedures, subroutines, segments of program codes, drivers, firmware, microcodes, circuits, data structures, and variables. The functions provided in the components and "units" may be combined into fewer components and "units", or further divided into more components and "units".

Hereinafter, preferred embodiments of a brake redundancy system and an operating method thereof according to the present disclosure will be described in detail with reference to the accompanying drawings.

First, a brake redundancy system according to a preferred embodiment of the present disclosure will be described with reference to FIGS. 1 and 2.

Figure 1:
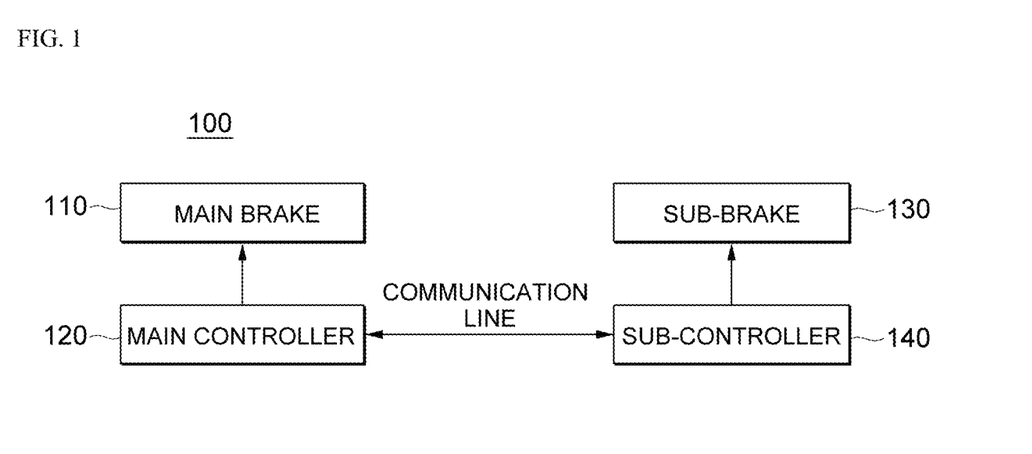
FIG. 1 is a block diagram illustrating a brake redundancy system according to a preferred embodiment of the present disclosure.
Figure 2:
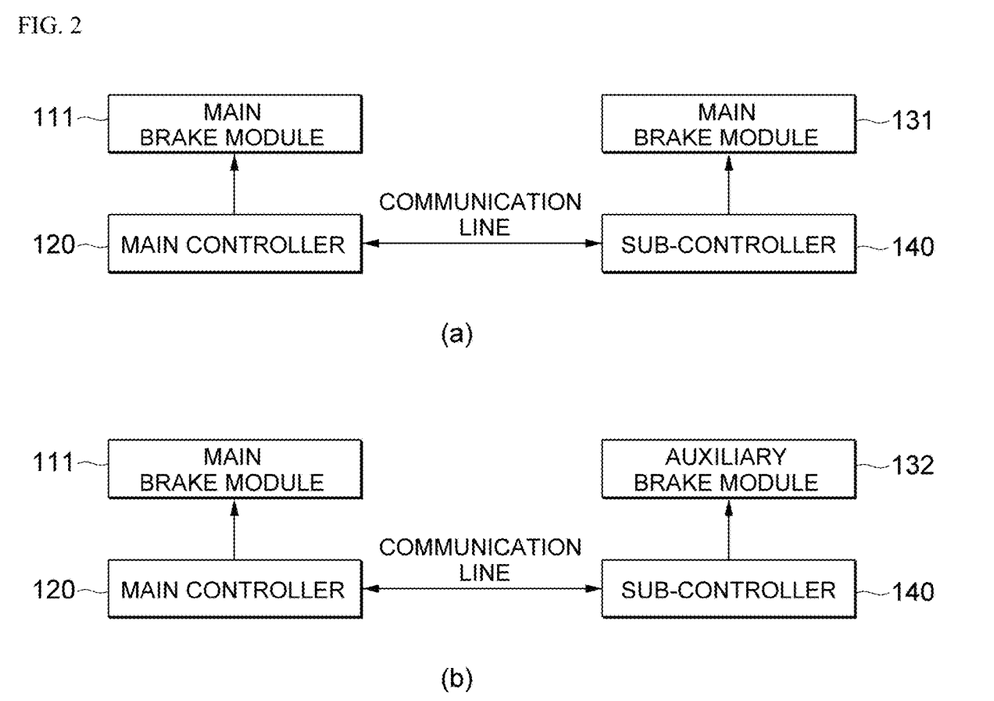
FIG. 2 is examples of the brake redundancy system shown in FIG. 1 according to embodiments of the present disclosure.

FIG. 1 is a block diagram illustrating a brake redundancy system according to a preferred embodiment of the present disclosure, and FIG. 2 is examples of the brake redundancy system shown in FIG. 1, in which FIG. 2(a) shows a symmetric type brake redundancy system and FIG. 2(b) shows an asymmetric type brake redundancy system.

Referring to FIG. 1, a brake redundancy system 100 according to a preferred embodiment of the present disclosure may comprise a main controller 120 serving as a main brake controller and a sub-controller 140 serving as an auxiliary brake controller that performs the brake control of a vehicle in the event of a failure of the main controller 120.

In other words, according to an embodiment of the brake redundancy system of the present disclosure, the sub-controller 140 may monitor the state of the main controller 120 and perform the brake control on behalf of the main controller 120 in the event of a failure of the main controller 120. In conventional brake redundancy systems, the main controller 120 sends a control request to the sub-controller 140, but the sub-controller 140 cannot receive the control request from the main controller 120 when a failure associated with the main controller 120 occurs (for example, a failure of a power system of the main controller 120 or a failure such as a short circuit in a communication line between the main controller 120 and the sub-controller 140). For example, in the event of the failure associated with the main controller 120 while performing a function for maintaining the stopped state of the vehicle, such as an Auto Vehicle Hold (AVH) function, the vehicle may move and cause an accident, and thus the sub-controller 140 may operate on behalf of the main controller 120 to keep the vehicle stationary, thereby preventing a vehicle accident. Some embodiments of the present disclosure provide a control strategy concept from the viewpoint of the sub-controller by identifying the failure associated with the main controller 120 such as a failure of the main controller 120 or a communication failure between the main controller 120 and the sub-controller 140. Accordingly, certain embodiments of the present disclosure can provide a more robust redundancy system than conventional brake redundancy systems from the viewpoint of the main controller.

More specifically, when the vehicle starts to drive, the main controller 120 may operate in an active mode and control the braking of the vehicle by means of a main brake 110.

When the vehicle starts to drive, the sub-controller 140 may operate in a hot-standby mode and continue to monitor the state of the main controller 120. The hot-standby mode may be, for example, but not limited to, a type of redundancy and failover strategy used to ensure continuous operation and minimize downtime in the event of a failure. Moreover, if it is determined that the operation of the main controller 120 is impossible or failed, the sub-controller 140 may switch its mode from the hot-standby mode to the active mode and control the braking of the vehicle by means of a sub-brake 130 on behalf of the main controller 120.

The main controller 120 and the sub-controller 140 may be connected to each other through a communication line such as a controller area network (CAN) communication line to transmit and receive various signals. The communication lines may be duplicated across a plurality of sub-communication lines.

The main brake 110 may comprise a main brake assembly or module configured to generate a braking force to reduce the speed of the vehicle or stop the vehicle in a normal situation. The main brake assembly or module may comprise a hydraulic brake module or the like. Of course, the main brake 110 may further comprise an auxiliary brake module that generates a braking force in a specific situation. For example, the auxiliary brake module may be a parking brake such as an electric parking brake (EPB) module configured to generate a braking force to prevent the vehicle from moving while the vehicle is stopped, an auxiliary brake configured to generate a braking force to control the speed of the vehicle to prevent the vehicle from accelerating on a downhill, and so on.

The sub-brake 130 may comprise at least one of the main brake assembly or module and the auxiliary brake module. For example, as shown in FIG. 2(a), the sub-brake 130 may comprise a main brake module 131, which is the same brake module as the main brake module 111 of the main brake 110. In this case, the brake redundancy system 100 according to an embodiment of the present disclosure may be a symmetric type brake redundancy system. Alternatively, as shown in FIG. 2(b), the sub-brake 130 may comprise an auxiliary brake module 132, which is not the same brake module as the main brake module 111 of the main brake 110. In this case, the brake redundancy system 100 according to another embodiment of the present disclosure corresponds to an asymmetric type brake redundancy system.

Next, a method of operating a brake redundancy system according to a preferred embodiment of the present disclosure will be described with reference to FIGS. 3 to 5.

Figure 3:
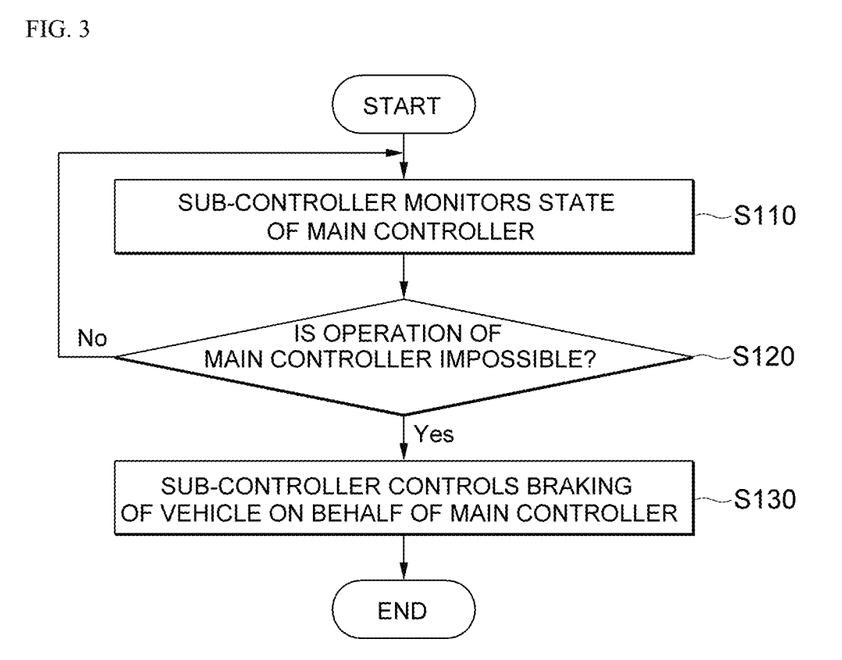
FIG. 3 is a flowchart illustrating a method of operating a brake redundancy system according to a preferred embodiment of the present disclosure.
Figure 4:
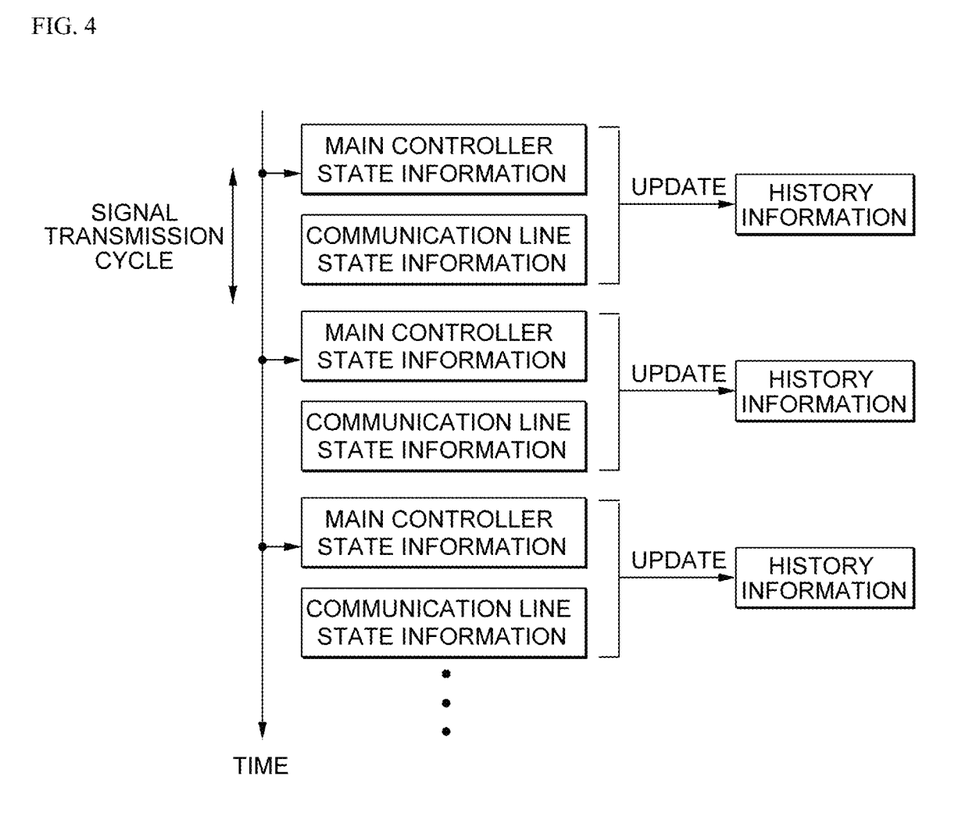
FIG. 4 is a diagram illustrating a step of monitoring a state of a main controller by a sub-controller shown in FIG. 3.
Figure 5:
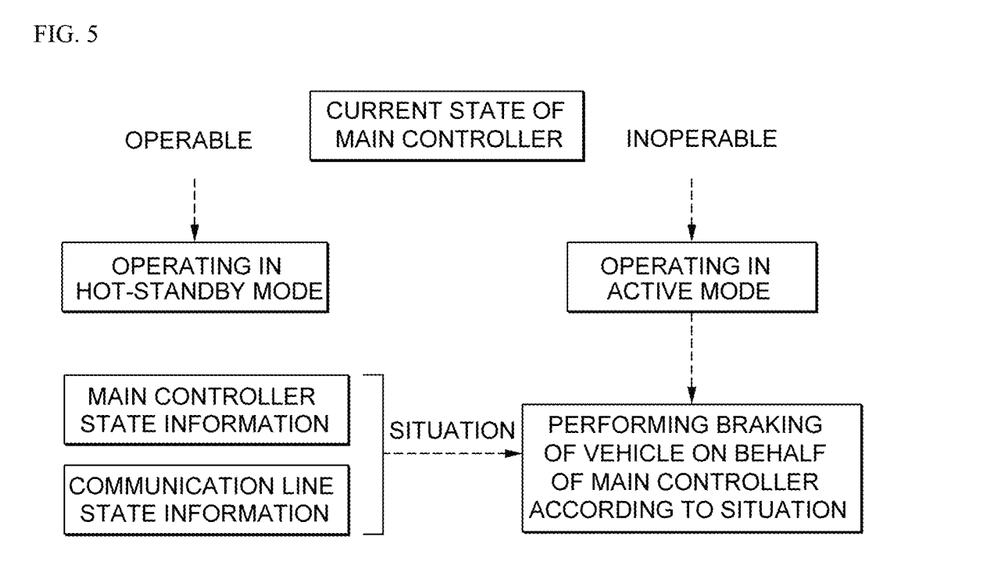
FIG. 5 is a diagram illustrating a step of controlling braking of a vehicle on behalf of a main controller shown in FIG. 3.

FIG. 3 is a flowchart illustrating a method of operating a brake redundancy system according to a preferred embodiment of the present disclosure, FIG. 4 is a diagram illustrating a step of monitoring a state of a main controller by a sub-controller shown in FIG. 3, and FIG. 5 is a diagram illustrating a step of controlling braking of a vehicle on behalf of a main controller shown in FIG. 3.

Referring to FIG. 3, the sub-controller 140 may monitor the state of the main controller 120 (step S110).

For instance, the sub-controller 140 may monitor the state of the main controller 120 based on main controller state information transmitted at a predetermined signal transmission cycle from the main controller 120 connected with the sub-controller 140 through the communication line such as the CAN communication line. The main controller 120 may transmit the main controller state information in a predetermined communication format, which is generated during the predetermined signal transmission cycle, to the sub-controller 140 through the communication line.

The main controller state information may comprise braking force state information of the main controller 120, indicating whether a braking force is either a normal state or a failure state, and operation function information of the main controller 120. For example, the main controller 120 may obtain the braking force state information indicating the failure state if a failure occurs in a solenoid valve, a motor, or other braking-related components or mechanisms, and obtain the braking force state information indicating the normal state if the braking-related components or mechanisms are normally operated. The operation function information may comprise information indicating whether the main controller 120 is operating or performing one or more braking functions, and brake function information indicating which brake functions are being operated. For example, if the main controller 120 is currently operating the "AVH function", the operation function information may comprise "whether or not the braking function is operating: the braking function is operating/braking function information: a AVH function and a target braking torque".

Moreover, the sub-controller 140 may update communication line state information and the main controller state information indicating whether the communication line and the main controller are in a normal state or a failure state to history information. For example, as shown in FIG. 4, the sub-controller 140 may continue to update the history information based on the main controller state information transmitted from the main controller 120 at intervals of the signal transmission cycle and the communication line state information.

Here, if the main controller state information is normally received from the main controller 120 according to the signal transmission cycle, the sub-controller 140 may determine that the communication line is operating normally and obtain the communication line state information indicating whether the communication line is in a normal state. At this time, in the case where the communication line is duplicated with a plurality of sub-communication lines, if the main controller state information is normally received through at least one of the sub-communication lines, the sub-controller 140 may determine that the communication line is operating normally and obtain the communication line state information indicating that the communication line is in a normal state. On the other hand, if the sub-controller 140 does not receive the main controller state information from the main controller 120 at the time point when the sub-controller 140 should receive the main controller state information from the main controller 120 according to the signal transmission cycle, the sub-controller 140 may determine that a failure has occurred in the communication line and obtain the communication line state information indicating that the main controller 120 is in a failure state. For example, if the communication line is abnormally operated in the event of a power system failure, a communication chip failure, or a short circuit in the communication line, the sub-controller 140 may not be able to receive the main controller state information through the communication line. In the case where the communication line is duplicated with a plurality of sub-communication lines, if the sub-controller 140 does not receive the main controller state information through all of the plurality of sub-communication lines, the sub-controller 140 may determine that a failure has occurred in the communication line and obtain the communication line state information indicating that the communication line is in a failure state. If the sub-controller 140 normally receives the main controller state information from the main controller 120 according to the signal transmission cycle but the received main controller state information does not conform with the predetermined communication format, the sub-controller 140 may determine that a failure has occurred in the communication line and obtain the communication line state information indicating that the communication line is in a failure state.

For example, the sub-controller 140 may construct the history information as shown in the following Table 1 based on the main controller state information transmitted from the main controller 120 according to the signal transmission cycle:

TABLE 1

| Time | State information of the main controller | | |
|---|---|---|---|
| | Communication line state information | Braking force state information | Operation function information |
| 00 h 00 m 00 s | normal | normal | no |
| 00 h 00 m 01 s | normal | normal | AVH function & target braking torque during operation of the braking function |
| 00 h 00 m 02 s | normal | failure | — |
| | ... | | |

Then, if is the sub-controller 140 determines that the operation of the main controller 120 is impossible or that the main controller 120 is inoperable (e.g. Yes in step S120), the sub-controller 140 may control the braking of the vehicle on behalf of the main controller 120 (step S130). The case that the operation of the main controller 120 is impossible includes a case that the operation of the main controller 120 is failed or unable to be performed or a case that the main controller 120 is in a failure or abnormal state.

That is, the sub-controller 140 may obtain the current state of the main controller 120 based on the braking force state information transmitted from the main controller 120 at the current time point and the communication line state information corresponding to the current time point.

For example, the sub-controller 140 may obtain the current state of the main controller 120 as operable if the braking force state information indicates that the braking force is in a normal state and the communication line state information indicates that the communication line is in a normal state. On the contrary, the sub-controller 140 may obtain the current state of the main controller 120 as inoperable if the braking force state information indicates that the braking force is in a failure state or the communication line state information indicates that the communication line is in a failure state. The current state of the main controller 120 according to the braking force state information and the communication line state information can be indicated as shown in the following Table 2:

TABLE 2

| Braking force state information | Communication line state information | Current state of the main controller |
|---|---|---|
| normal | normal | operable |
| normal | failure | inoperable |
| failure | normal | inoperable |
| failure | failure | inoperable |

Moreover, the sub-controller 140 may control the braking of the vehicle on behalf of the main controller 120 if the current state of the main controller 120 is inoperable.

For instance, if the current state of the main controller 120 is inoperable, the sub-controller 140 may switch its mode from the hot-standby mode to the active mode and control the braking of the vehicle based on the history information on behalf of the main controller 120. For example, the sub-controller 140 may obtain the one or more functions, which have been performed by the main controller 120 before the sub-controller 140 determines that the main controller 120 is inoperable, from history information, and continue to perform the brake control, which the main controller 120 has performed, based on the function obtained from the history information. If the sub-controller 120 determines that the main controller 120 is not performing any function as a result of checking the function, which was performed by the main controller 120 before the main controller 120 is inoperable, from history information, the sub-controller 140 may operate in the active mode without performing the operation for braking the vehicle and wait for a braking-related signal from an electric control unit (ECU) of the vehicle.

At this time, as shown in FIG. 5, the sub-controller 140 may perform the braking of the vehicle on behalf of the main controller 120 according to a situation obtained or determined based on the main controller state information and the communication line state information. For instance, the situation can be obtained or determined based on the main controller state information and the communication line state information as shown in the following Table 3:

TABLE 3

| Braking force state information | Communication line state information | Current state of the main controller | Situation |
|---|---|---|---|
| normal | normal | operable | Case 1 |
| normal | failure | inoperable | Case 3 |
| failure | normal | inoperable | Case 2 |
| failure | failure | inoperable | Case 4 |

Referring to Table 3, if the current state of the main controller 120 is inoperable, the situation may be classified into Case 2 in which the communication line state information indicates that the communication line is in a normal state and the braking force state information indicates that the braking force is in a failure state and Cases 3 and 4 in which the communication line state information indicates that the communication line is in a failure state regardless of the braking force state information.

In the situation of Case 2 (in which the braking force state information indicates that the braking force is in a failure state and the communication line state information indicates that the communication line is in a normal state), the sub-controller 140 may obtain the operation function information, corresponding to the most recent time point when the braking force state information indicates that the braking force is in a normal state, from the history information, and control the braking of the vehicle based on the obtained operation function information. That is, the sub-controller 140 may obtain the operation function information on the function, which was performed by the main controller 120 at the time point when the braking force state information indicates that the braking force is in a normal state before the main controller 120 is inoperable, from history information, and continue to perform the brake control, which the main controller 120 is performed, based on the obtained operation function information. For example, if the obtained operation function information indicates "the braking function is being operated; the AVH function; and the target braking torque", the sub-controller 140 may operate the AVH function based on the target braking torque by means of the sub-brake 130 and continue to perform the brake control which the main controller 120 is performing. Of course, if the sub-controller 120 determines that the main controller 120 is not performing any operation function as a result of checking the operation function, which was performed by the main controller 120 at the most recent time point when the braking force state information indicates that the braking force is in a normal state before the main controller 120 is inoperable, from history information, the sub-controller 140 may operate in the active mode without performing the operation for braking the vehicle and wait for a braking-related signal from the ECU of the vehicle.

In the situation of Case 3 (in which the braking force state information indicates that the braking force is in a normal state and the communication line state information indicates that the communication line is in a failure state), or in the situation of Case 4 (in which the braking force state information indicates that the braking force is in a failure state and the communication line state information indicates that the communication line is in a failure state), the sub-controller 140 may obtain the operation function information, corresponding to the most recent time point when the communication line state information indicated that the communication line is in a normal state, from the history information, and control the braking of the vehicle based on the obtained operation function information. That is, the sub-controller 140 may obtain the operation function information on the function, which was performed by the main controller 120 at the time point when the communication line state information indicated that the communication line is in a normal state before the main controller 120 is inoperable, from history information, and continue to perform the brake control, which the main controller 120 performs, based on the obtained operation function information. For example, if the obtained operation function information indicates "the braking function is being operated; the AVH function; and the target braking torque", the sub-controller 140 may operate the AVH function based on the target braking torque by means of the sub-brake 130 and continue to perform the brake control which the main controller 120 performs. However, if the main controller 120 is not performing any operation function as a result of checking the operation function, which was performed by the main controller 120 at the most recent time point when the communication line state information indicated that the communication line is in a normal state before the main controller 120 is inoperable, from history information, the sub-controller 140 may operate in the active mode without performing the operation for braking the vehicle and wait for a braking-related signal from the ECU of the vehicle.

For instance, if the operation function according to the obtained operation function information is a stop control function for controlling a stop of the vehicle such as the "AVH function", the sub-controller 140 may drive the auxiliary brake module 132 of the sub-brake 130 based on the target braking torque according to the obtained operation function information to control the braking of the vehicle. That is, both the situation of Case 3 and the situation of Case 4 correspond to situations in which the current state of the main controller 120 is inoperable as the communication line state information indicates that the communication line is in a failure state. In the situation of Case 3, the braking force state of the main controller 120 is normal, whereas in the situation of Case 4, the braking force state of the main controller 120 is abnormal or faulty. As such, if the communication line state information indicates that the communication line is in a failure state, the sub-controller 140 is unable to check the state of the main controller 120 and thus determines that the current state of the main controller 120 is inoperable. However, in order to avoid brake control interference that may occur when the braking force state of the main controller 120 becomes normal, if there is an auxiliary brake module 132 in the sub-brake 130, the sub-controller 140 may drive the auxiliary brake module 132 first to continue to perform the brake control which the main controller 120 performs.

On the other hand, if the current state of the main controller 120 is operable (e.g. No in S120), the sub-controller 140 may operate in the hot-standby mode being operated to continue to monitor the state of the main controller 120.

That is, in the situation of Case 1 (in which the braking force state information indicates that the braking force is in a normal state and the communication line state information indicates that the communication line is in a normal state), the sub-controller 140 may operate in the hot-standby mode to monitor the state of the main controller 120 and update the history information.

Next, examples of a method of operating a brake redundancy system according to embodiments of the present disclosure will be described with reference to FIGS. 6 to 11.

The sub-controller 140 of the brake redundancy system 100 according to an embodiment of the present disclosure may perform the braking of the vehicle on behalf of the main controller 120 according to a situation obtained based on the main controller state information and the communication line state information as shown in Table 3 above.

Case 1

Figure 6:
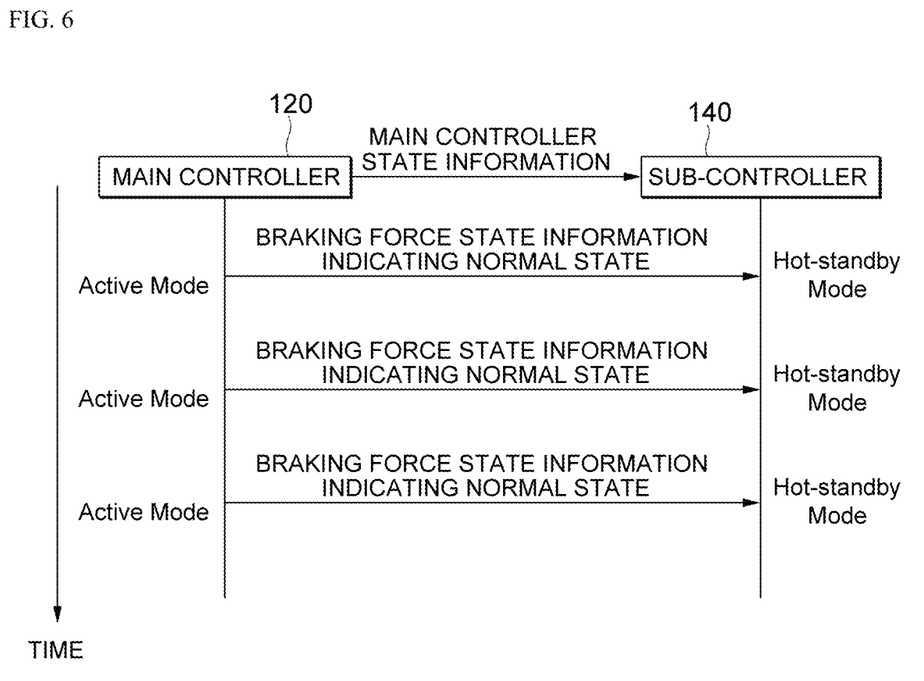
FIG. 6 is a time flow diagram illustrating a first example of a method of operating a brake redundancy system according to an embodiment of the present disclosure in a situation where braking force state information indicates that the braking force is in a normal state and communication line state information indicates that the communication line is in a normal state.

FIG. 6 is a time flow diagram illustrating a first example of a method of operating a brake redundancy system according to an embodiment of the present disclosure in a situation where the braking force state information indicates that the braking force is in a normal state and the communication line state information indicates that the communication line is in a normal state.

Referring to FIG. 6, in the situation of Case 1 (in which the braking force state information indicates that the braking force is in a normal state and the communication line state information indicates that the communication line is in a normal state), the braking force state of the main controller 120 is normal, and thus the main controller 120 may operate in an active mode to perform the braking-related functions. At this time, the sub-controller 140 may operate in a hot-standby mode to monitor the state of the main controller 120 and update the history information.

Case 2

Figure 7:
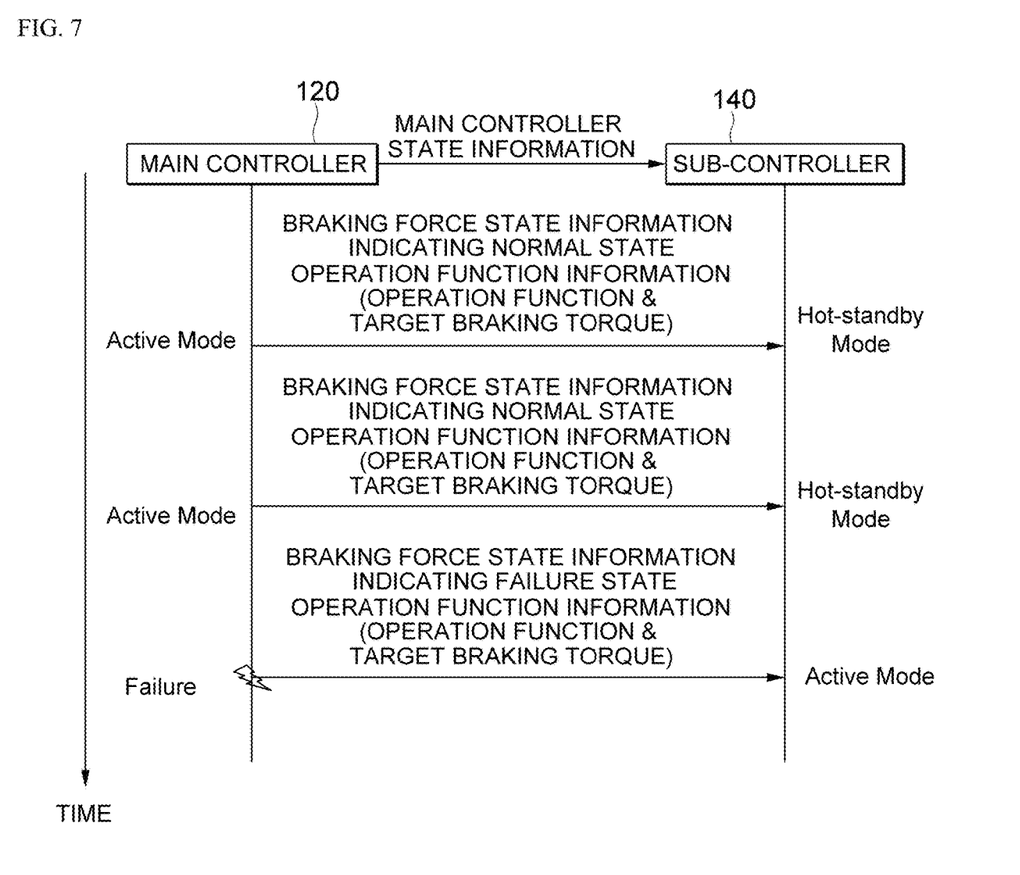
FIG. 7 is a time flow diagram illustrating another example of a method of operating a brake redundancy system according to another embodiment of the present disclosure in a situation where braking force state information indicates that the braking force is in a failure state and communication line state information indicates that the communication line is in a normal state.
Figure 8:
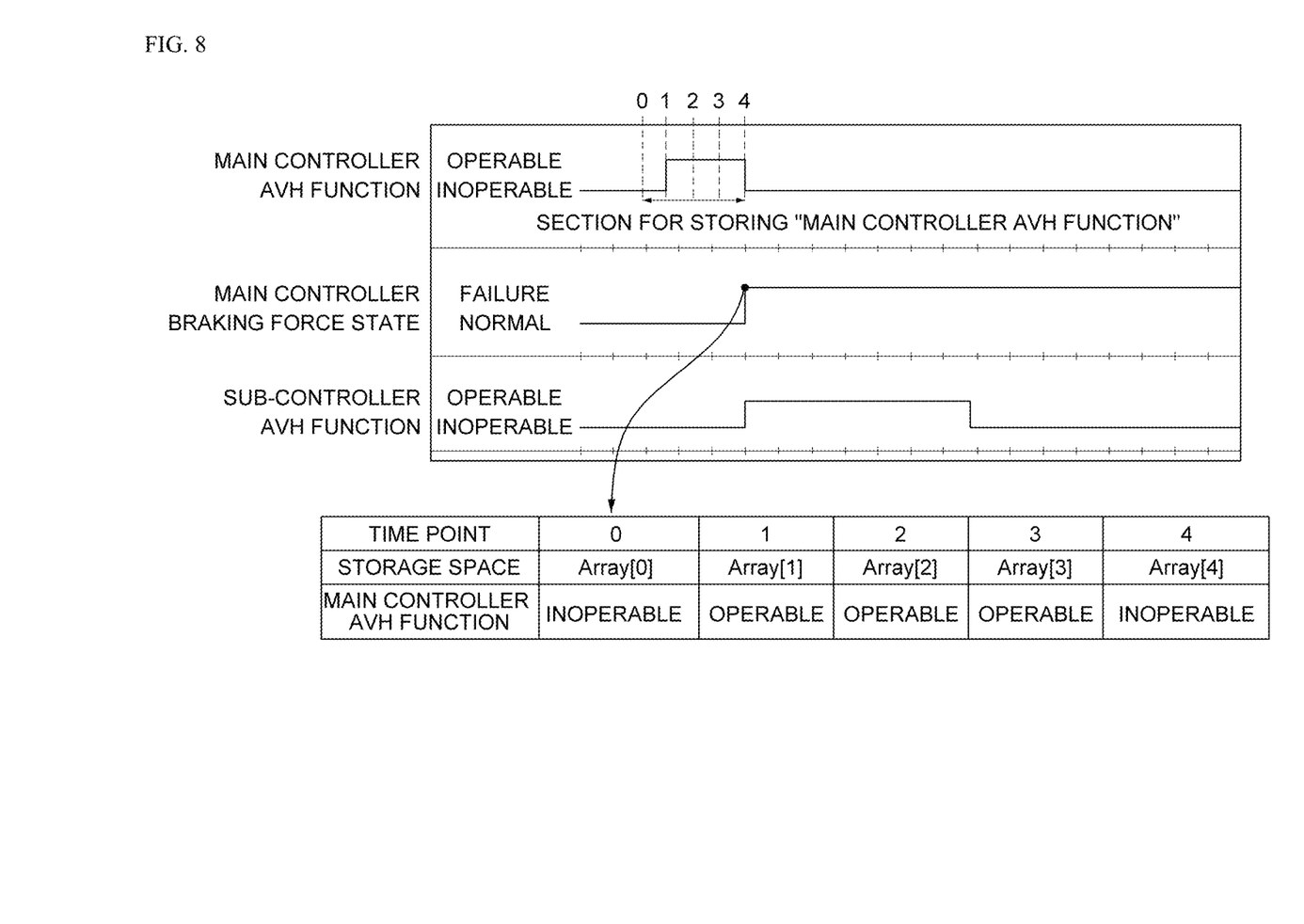
FIG. 8 is a diagram illustrating an example of a method for storing history information according to an embodiment of the present disclosure.
Figure 9:
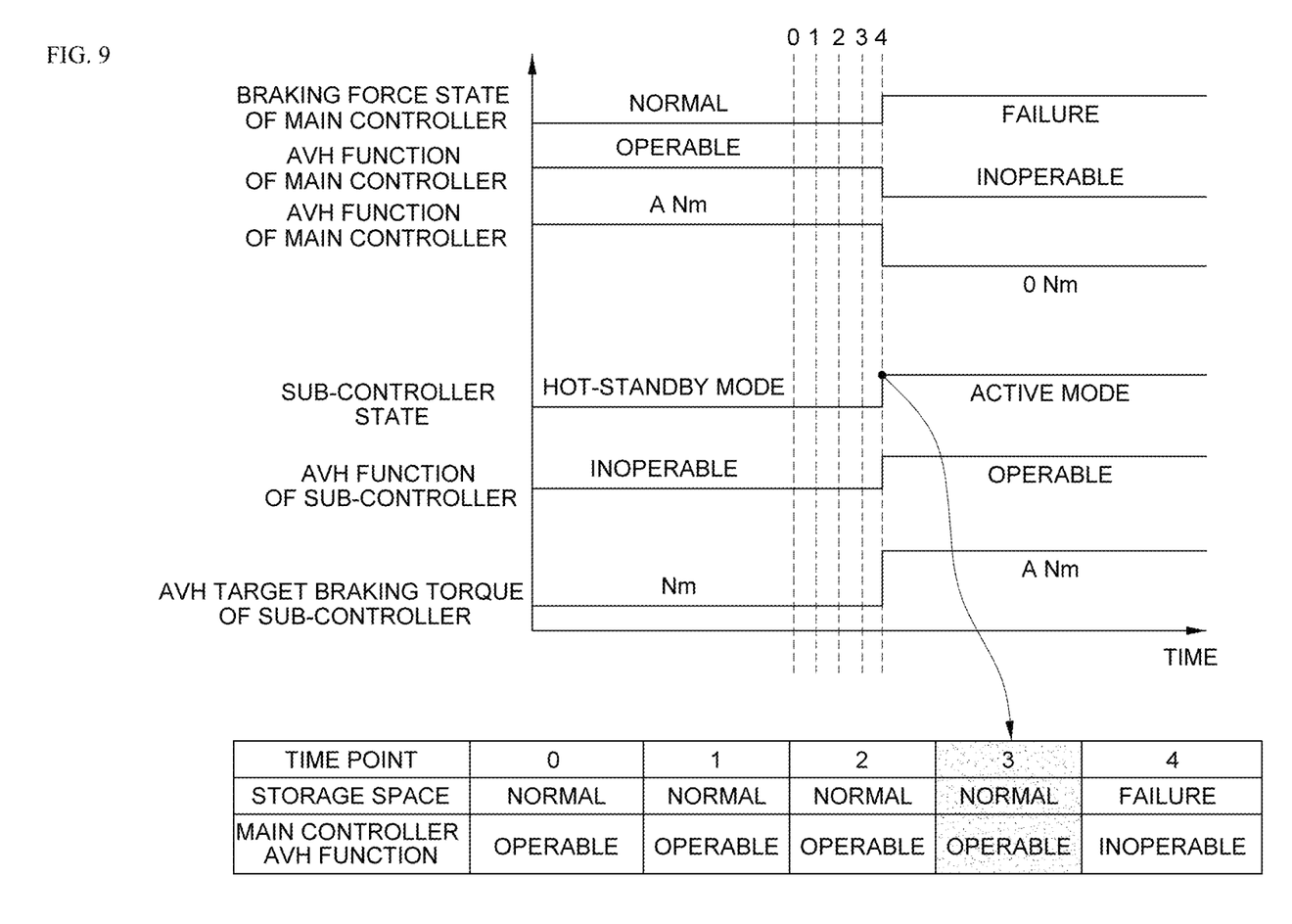
FIG. 9 is a diagram illustrating a control operation in a situation shown in FIG. 7.

FIG. 7 is a time flow diagram illustrating another example of a method of operating a brake redundancy system according to another embodiment of the present disclosure in a situation where the braking force state information indicates that the braking force is in a failure state and the communication line state information indicates that the communication line is in a normal state, FIG. 8 is a diagram illustrating an example of a method for storing history information according to an embodiment of the present disclosure, and FIG. 9 is a diagram illustrating a control operation in a situation shown in FIG. 7.

Referring to FIG. 7, in the situation of Case 2 (in which the braking force state information indicates that the braking force is in a failure state and the communication line state information indicates that the communication line is in a normal state), the sub-controller 140 may receive braking force state information, indicating that the braking force is in a failure state, from the main controller 120 to identify or recognize that the main controller 120 has a failure in the braking force and may operate in an active mode. At this time, for continuous brake control, the sub-controller 140 may control the braking of the vehicle based on the history information.

The history information may be obtained during the monitoring process of the main controller 120 performed by the sub-controller 140. For example, referring to FIG. 8, since the control state of the main controller 120 is highly likely to change at the time point of a failure or inoperability of the main controller 120, the operation information of the main controller 120 may be stored in the form of the history information in a memory of the sub-controller 140 and used thereafter. As shown in FIG. 8, the history information "Array" may be updated by continuously performing the process of storing the operating state of the AVH function of the main controller 120 corresponding to time point "0" in "Array[0]" and the operating state of the AVH function of the main controller 120 corresponding to time point "1" in "Array[1]" based on the main controller state information transmitted from the main controller 120 at intervals of the signal transmission cycle. Of course, there are other techniques than the method of using the Array to store information, such as a bit shift technique, a ring buffer technique, etc.

That is, the sub-controller 140 may control the braking of the vehicle based on the function operated in the main controller 120 and the target braking torque of the corresponding function using the information at the most recent time point when the "braking force state" is "normal". For example, referring to FIG. 9, if is the sub-controller 140 determines that the main controller 120 is inoperable at time point "4", the sub-controller 140 may continue to perform the "AVH function", which was operated by the main controller 120 at most recent time point "3" when the "braking force state" is "normal", based on the target braking torque "A Nm (A is greater than 0)".

Case 3 & Case 4

Figure 10:
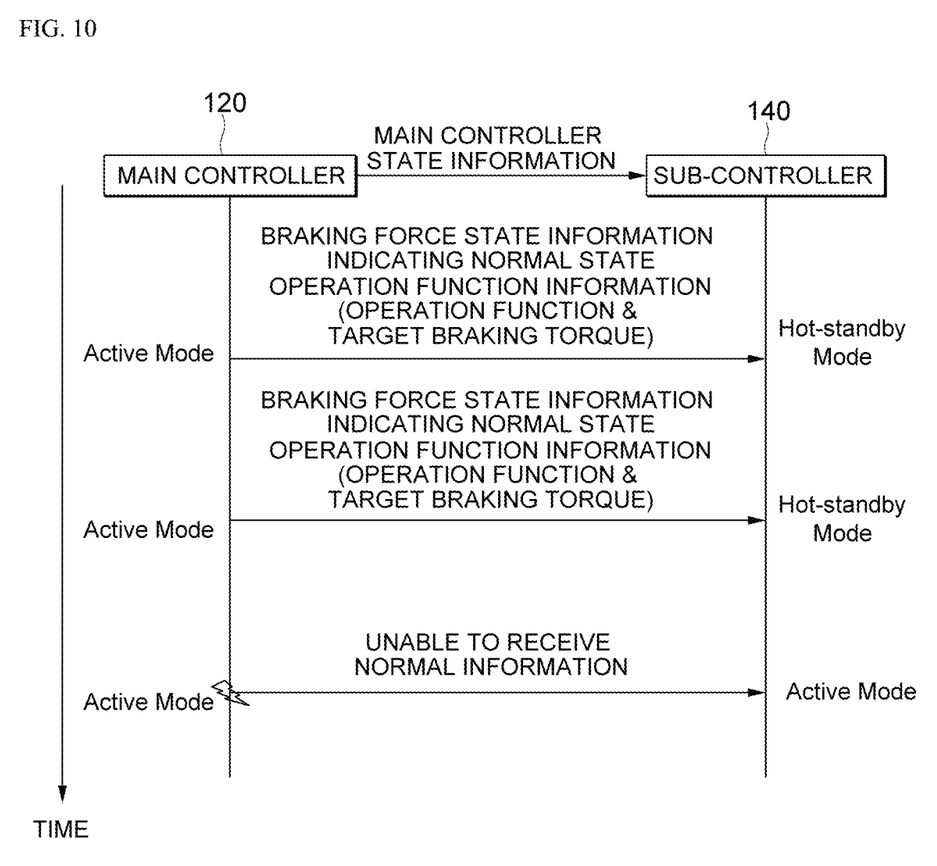
FIG. 10 is a time flow diagram illustrating an example of a method of operating a brake redundancy system according to a preferred embodiment of the present disclosure in a situation where communication line state information indicates that the communication line is in a failure state.
Figure 11:
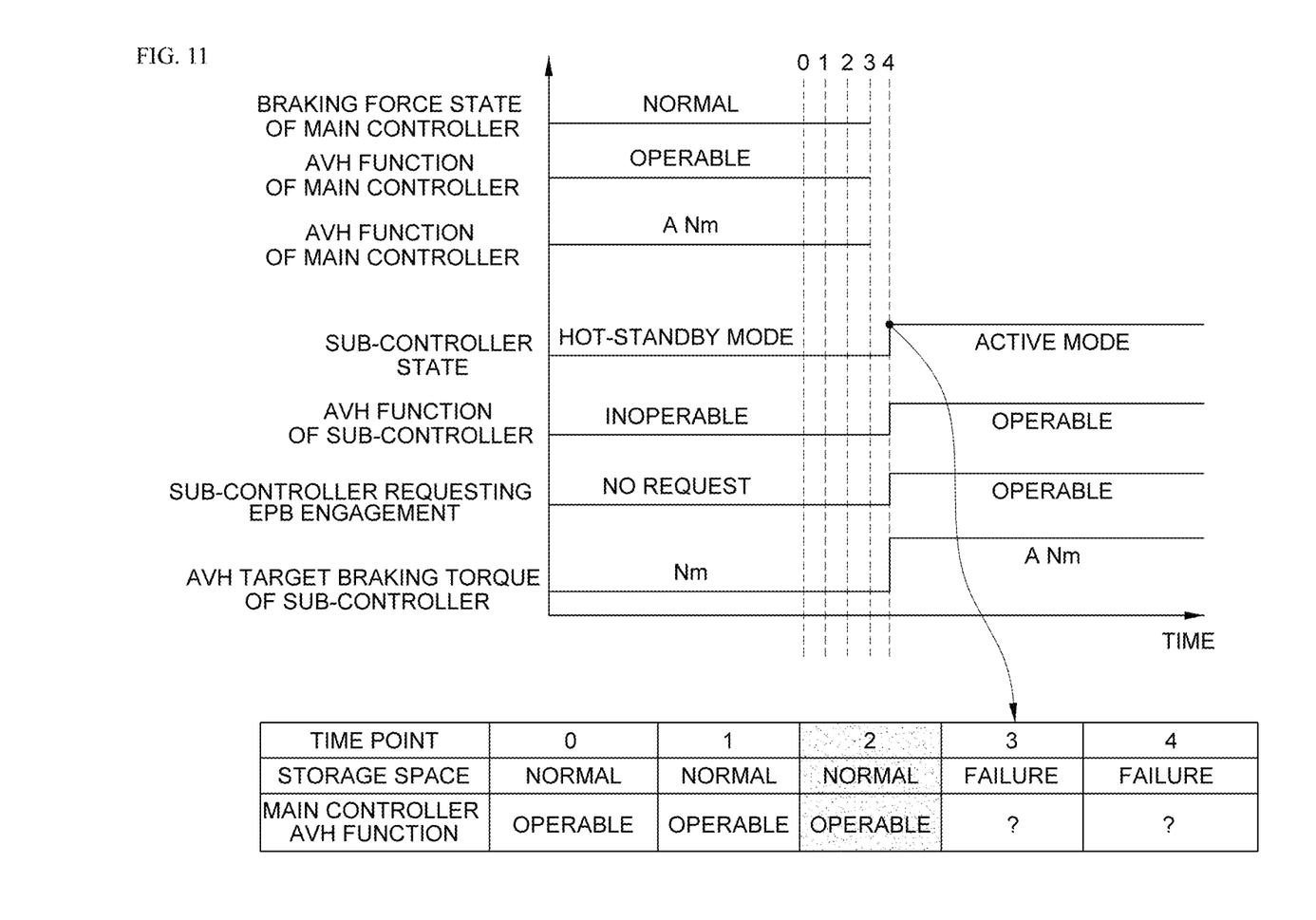
FIG. 11 is a diagram illustrating a control operation in a situation shown in FIG. 10.

FIG. 10 is a time flow diagram illustrating an example of a method of operating a brake redundancy system according to a preferred embodiment of the present disclosure in a situation where the communication line state information indicates that the communication line is in a failure state, and FIG. 11 is a diagram illustrating a control operation in a situation shown in FIG. 10.

Referring to FIG. 10, in the situation of Case 3 (in which the braking force state information indicates that the braking force is in a normal state and the communication line state information indicates that the communication line is in a failure state), or in the situation of Case 4 (in which the braking force state information indicates that the braking force is in a failure state and the communication line state information indicates that the communication line is in a failure state), the sub-controller 140 is unable to receive the "main controller state information" and thus may operate in an active mode regardless of the actual state of the main controller 120. At this time, for continuous brake control, the sub-controller 140 may control the braking of the vehicle based on the history information.

At this time, since the state of the main controller 120 is not known, there may be an overlapping activation in which both the main controller 120 and the sub-controller 140 operate in the active mode, and thus the sub-controller 140 may adopt different processes or policies depending on the situations. That is, if the sub-controller 140 does not receive the "main controller state information" due to a failure in the communication line while the main controller 120 is operating the stop control function for controlling the stop of the vehicle such as the "AVH function", and if there is an auxiliary brake module 132 in the sub-brake 130 such as an electronic parking brake (EPB) module, in order to avoid control interference between the main controller 120 and the sub-controller 140, the sub-controller 140 may engage the auxiliary brake module 132 first to continue to perform the brake control of the main controller 120. For example, referring to FIG. 11, if is the sub-controller 140 determines that the main controller 120 is inoperable at time point "4", the sub-controller 140 may engage the electronic parking brake (EPB) module first by performing the "AVH function", which was operated by the main controller 120 at most recent time point "3" when the "communication line state" is "normal", based on the target braking torque "A Nm (A is greater than 0)", and continue to perform the brake control of the main controller 120.

Although all the components constituting the embodiments of the present disclosure have been described as being combined into one or being operated in a combined state, the present disclosure is not essentially limited to the embodiments. That is, all the components may be selectively combined and operated as one or more components within the scope of the present disclosure. In addition, although all the components may be implemented respectively as independent hardware, some or all of the components may be selectively combined and implemented as a computer program having a program module performing some or all functions combined in one or more pieces of hardware. Moreover, the computer program may be stored in computer-readable media, such as a universal serial bus (USB) memory, a compact disk (CD), and a flash memory, and read and executed by a computer to implement the embodiments of the present disclosure. The storage media of the computer program may include a magnetic recording medium, an optical recording medium, etc.

The above description is merely illustrative of the technical idea of the present disclosure, and various modifications, changes, and substitutions may be made thereto by those skilled in the art without departing from the essential characteristics of the present disclosure. Therefore, the embodiments disclosed herein and the accompanying drawings are not intended to limit the technical spirit of the present disclosure, but rather to illustrate the technical idea of the present disclosure, and the technical spirit of the present disclosure is not limited by these embodiments and the accompanying drawings. The protection scope of the present disclosure should be interpreted by the following claims, and all technical ideas within the scope equivalent thereto should be interpreted as being included in the scope of the present disclosure.

What is claimed is:

1. A brake redundancy system comprising:
a main controller configured to control braking of a vehicle; and
a sub-controller configured to monitor a state of the main controller based on main controller state information indicating the state of the main controller, and control the braking of the vehicle if determining that the main controller is inoperable,
wherein the main controller state information comprises operation function information of the main controller indicating an operation function performed by the main controller, and
wherein the sub-controller is configured to, if the operation function information indicates that a stop control function for controlling a stop of the vehicle is performed by the main controller at a most recent time point in which a communication line state information, indicates that a communication line connecting between the main controller and the sub-controller is in a normal state, control the braking of the vehicle by driving an auxiliary brake based on a target braking torque according to the operation function information.

2. The brake redundancy system of claim 1, wherein the main controller state information is transmitted from the main controller at a predetermined signal transmission cycle.

3. The brake redundancy system of claim 2, wherein the main controller state information further comprises braking force state information of the main controller indicating whether a braking force for the braking of the vehicle is in a normal state or in a failure state.

4. The brake redundancy system of claim 3, wherein the sub-controller is configured to update the communication line state information, indicating whether the communication line connecting between the main controller and the sub-controller is in the normal state or a failure state, and the main controller state information, indicating the state of the main controller, to history information.

5. The brake redundancy system of claim 4, wherein the sub-controller is configured to check the state of the main controller based on the braking force state information, indicating whether the braking force for the braking of the vehicle is in the normal state or in the failure state, and the communication line state information, indicating whether the communication line is in the normal state or the failure state.

6. The brake redundancy system of claim 1, wherein the sub-controller is configured to control the braking of the vehicle on behalf of the main controller if the main controller is inoperable.

7. The brake redundancy system of claim 5, wherein the sub-controller is configured to:
determine that the main controller is operable if the braking force state information indicates that the braking force for the braking of the vehicle is in the normal state and the communication line state information indicates that the communication line is in the normal state, and
determine that the main controller is inoperable if the braking force state information indicates that the braking force for the braking of the vehicle is in the failure state or if the communication line state information indicates that the communication line is in the failure state.

8. The brake redundancy system of claim 7, wherein the sub-controller is configured to control the braking of the vehicle on behalf of the main controller based on the history information if the main controller is inoperable.

9. The brake redundancy system of claim 8, wherein the sub-controller is configured to, if the braking force state information indicates that the braking force is in the failure state and the connection line state information indicates that the connection line is in the normal state, obtain the operation function information, indicating an operation function performed by the main controller at a most recent time point in which the braking force state information indicates that the braking force for the braking of the vehicle is in the normal state, from the history information, and control the braking of the vehicle based on the obtained operation function information.

10. The brake redundancy system of claim 8, wherein the sub-controller is configured to, if the communication line state information indicates that the communication line is in the failure state, obtain the operation function information, indicating an operation function performed by the main controller at a most recent time point in which the communication line state information indicates that the communication line is in the normal state, from the history information, and control the braking of the vehicle based on the obtained operation function information.

11. A method of operating a brake redundancy system comprising a main controller and a sub-controller configured to control braking of a vehicle, the method comprising:
monitoring, by the sub-controller, a state of the main controller based on main controller state information indicating the state of the main controller; and
controlling, by the sub-controller, braking of the vehicle if the sub-controller determines that the main controller is inoperable,
wherein the main controller state information comprises operation function information of the main controller indicating an operation function performed by the main controller, and
wherein the controlling of the braking of the vehicle comprises, if the operation function information indicates that a stop control function for controlling a stop of the vehicle is performed by the main controller at a most recent time point in which a communication line state information indicates that a communication line connecting between the main controller and the sub-controller is in a normal state, controlling the braking of the vehicle by driving an auxiliary brake based on a target braking torque according to the operation function information.

12. The method of claim 11, wherein the main controller state information is transmitted from the main controller at a predetermined signal transmission cycle.

13. The method of claim 12, wherein the main controller state information further comprises braking force state information of the main controller indicating whether a braking force for the braking of the vehicle is in a normal state or a failure state.

14. The method of claim 13, wherein the monitoring of the state of the main controller comprises updating the communication line state information, indicating whether the communication line connecting between the main controller and the sub-controller is in the normal state or a failure state, and the main controller state information, indicating whether the communication line is in the normal state or the failure state, to history information.

15. The method of claim 14, wherein the state of the main controller is monitored based on the braking force state information, indicating whether the braking force for the braking of the vehicle is in the normal state or the failure state, and the communication line state information, indicating whether the communication line is in the normal state or the failure state.

16. The method of claim 15, wherein the controlling of the braking of the vehicle comprises controlling the braking of the vehicle on behalf of the main controller based on the history information if the main controller is inoperable.

17. The method of claim 16, wherein the controlling of the braking of the vehicle comprises, if the braking force state information indicates that the braking force is in the failure state and the connection line state information indicates that the connection line is in the normal state, obtaining the operation function information indicating an operation function performed by the main controller at a most recent time point in which the braking force state information indicates that the braking force for the braking of the vehicle is in the normal state, from the history information, and controlling the braking of the vehicle based on the obtained operation function information.

18. The method of claim 16, wherein the controlling of the braking of the vehicle comprises, if the communication line state information indicates that the communication line is in the failure state, obtaining the operation function information, indicating an operation function performed by the main controller at a most recent time point in which the communication line state information indicates that the communication line is in the normal state, from the history information, and controlling the braking of the vehicle based on the obtained operation function information.

* * * * *